US012072009B2

(12) United States Patent
Balsiger et al.

(10) Patent No.: US 12,072,009 B2
(45) Date of Patent: Aug. 27, 2024

(54) HARMONIC GEARSET WITH SPLIT FLEXSPLINE

(71) Applicant: Hamilton Sundstrand Corporation, Charlotte, NC (US)

(72) Inventors: Derick S. Balsiger, Prescott Valley, AZ (US); Keith A. Bloxham, Gilbert, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 166 days.

(21) Appl. No.: 17/826,231

(22) Filed: May 27, 2022

(65) Prior Publication Data

US 2023/0383831 A1 Nov. 30, 2023

(51) Int. Cl.
*F16H 49/00* (2006.01)
*B64C 13/24* (2006.01)
*B64C 13/26* (2006.01)
*F16H 19/08* (2006.01)

(52) U.S. Cl.
CPC ........... *F16H 49/001* (2013.01); *B64C 13/26* (2013.01); *F16H 19/08* (2013.01); *F16H 2049/003* (2013.01)

(58) Field of Classification Search
CPC .. F16H 19/08; F16H 49/001; F16H 2049/003; F16H 2049/006; B64C 13/26; B64C 13/34
See application file for complete search history.

(56) References Cited

U.S. PATENT DOCUMENTS

| 3,435,705 | A | 4/1969 | Musser | |
|---|---|---|---|---|
| 7,854,995 | B1 * | 12/2010 | Anderson | ............... B23P 15/14 |
| | | | | 428/546 |
| 9,157,517 | B2 | 10/2015 | Lunin et al. | |
| 9,394,984 | B2 * | 7/2016 | Balsiger | ................. H02K 7/116 |
| 9,915,334 | B2 * | 3/2018 | Balsiger | ................ F16H 49/001 |
| 10,060,517 | B2 * | 8/2018 | Kiyono | ................ F16H 49/001 |
| 10,400,878 | B2 * | 9/2019 | Balsiger | ................ F16H 49/001 |
| 10,584,782 | B2 * | 3/2020 | Balsiger | ................. B64C 13/34 |
| 10,883,590 | B2 * | 1/2021 | Balsiger | ................. H02K 7/116 |
| 11,085,518 | B2 * | 8/2021 | Balsiger | ................. B64C 13/28 |
| 11,149,834 | B2 * | 10/2021 | Balsiger | ................ F16H 49/001 |

(Continued)

FOREIGN PATENT DOCUMENTS

DE 102017111381 A1 11/2018
EP 3312475 A2 4/2018

(Continued)

OTHER PUBLICATIONS

Extended European Search Report issued in European Application No. 23173934.3 dated Sep. 25, 2023.

*Primary Examiner* — Adam D Rogers
(74) *Attorney, Agent, or Firm* — CANTOR COLBURN LLP

(57) ABSTRACT

A harmonic gearset, having: a drive shaft; first and second ground gears spaced apart from each other along the drive shaft; an output gear disposed on the drive shaft, between the first and second ground gears; a first flexspline disposed radially between the drive shaft, the first ground gear and the output gear; and a second flexspline disposed radially between the drive shaft, the second ground gear and the output gear, wherein the first and second flexsplines are axially adjacent to each other.

12 Claims, 4 Drawing Sheets

(56) References Cited

U.S. PATENT DOCUMENTS

| | | | |
|---|---|---|---|
| 11,519,487 B2 * | 12/2022 | Balsiger | F16H 3/02 |
| 11,713,108 B2 * | 8/2023 | Balsiger | B64C 9/00 |
| | | | 244/99.2 |
| 2021/0071744 A1 | 3/2021 | Balsiger et al. | |
| 2021/0156460 A1 | 5/2021 | Zimmermann | |
| 2021/0381588 A1 | 12/2021 | Ling | |

FOREIGN PATENT DOCUMENTS

| | | | | |
|---|---|---|---|---|
| EP | 3726096 A1 | | 10/2020 | |
| JP | 2013181636 A | * | 9/2013 | |
| KR | 20130075862 A | * | 7/2013 | |
| WO | WO-2017022062 A1 | * | 2/2017 | F16H 1/32 |

* cited by examiner

HARMONIC GEARSET WITH SPLIT FLEXSPLINE

BACKGROUND

Exemplary embodiments pertain to the art of geared actuator assemblies and, more specifically, to a harmonic gearset with a split flexspline.

Harmonic gearsets may have a center gear located between ground gears. The ground gears may have the same gear tooth profile and the center gear may have a different tooth profile than the ground gears. A flexspline may be configured to engage the center and ground gears. When using a single flexspline for this purpose, the configuration of the gear and spline tooth profiles may be limited, to avoid interference between the gear and spline teeth during assembly.

BRIEF DESCRIPTION

Disclosed is a harmonic gearset, including: a drive shaft; first and second ground gears spaced apart from each other along the drive shaft; an output gear disposed on the drive shaft, between the first and second ground gears; a first flexspline disposed radially between the drive shaft, the first ground gear and the output gear; and a second flexspline disposed radially between the drive shaft, the second ground gear and the output gear, wherein the first and second flexsplines are axially adjacent to each other.

In addition to one or more features of the gearset, or as an alternate, the first flexspline has a first set of splines that engages the first ground gear and a second set of splines that engages the output gear; and the second flexspline has a third set of splines that engages the second ground gear and a fourth set of splines that engages the output gear.

In addition to one or more features of the gearset, or as an alternate, the first and third sets of splines have a same shape as each other.

In addition to one or more features of the gearset, or as an alternate, the second and fourth sets of splines have a same shape as each other.

In addition to one or more features of the gearset, or as an alternate, the first and second flexsplines have a same shape as each other.

In addition to one or more features of the gearset, or as an alternate, the gearset further includes a wave generator that is driven by the drive shaft; and a wave generator bearing set disposed radially between the wave generator and the first and second flexsplines.

Further disclosed is an actuator assembly, including: a motor; and a gearset having one or more of the above disclosed aspects, wherein the drive shaft is driven by the motor.

Further disclosed is an aircraft including: a movable structure; a stationary structure; an actuator assembly having one or more of the above disclosed aspects, operationally coupled between the movable structure and the stationary structure.

In addition to one or more features of the aircraft, or as an alternate, the movable structure is a control surface; and the stationary structure is an airframe.

A method of assembling a harmonic gearset, including: positioning a first flexspline radially within an output gear; positioning a second flexspline radially within the output gear so that the first flexspline and the second flexspline are axially adjacent to each other.

In addition to one or more features of the method, or as an alternate the first flexspline includes a first set of splines and a second set of splines that are axially adjacent to each other, and the second flexspline includes a third set of splines and a fourth set of splines that are axially adjacent to each other, and wherein: positioning the first flexspline radially within the output gear includes positioning the second set of splines of the first flexspline radially within the output gear; and positioning the second flexspline radially within the output gear includes positioning the fourth set of splines of the second flexspline radially within the output gear.

In addition to one or more features of the method, or as an alternate, the method includes positioning the first set of splines of the first flexspline radially within a first ground gear; and positioning the third set of splines of the second flexspline radially within a second ground gear.

In addition to one or more features of the method, or as an alternate, the method includes positioning a wave generator bearing set radially within the first and second flexsplines; positioning a wave generator radially within the wave generator bearing set; and positioning a drive shaft radially within the wave generator.

Further disclosed is a method of assembling an actuator assembly, including: assembling the compound harmonic gearset according to a method having one or more of the above disclosed aspects, and connecting a motor to the drive shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
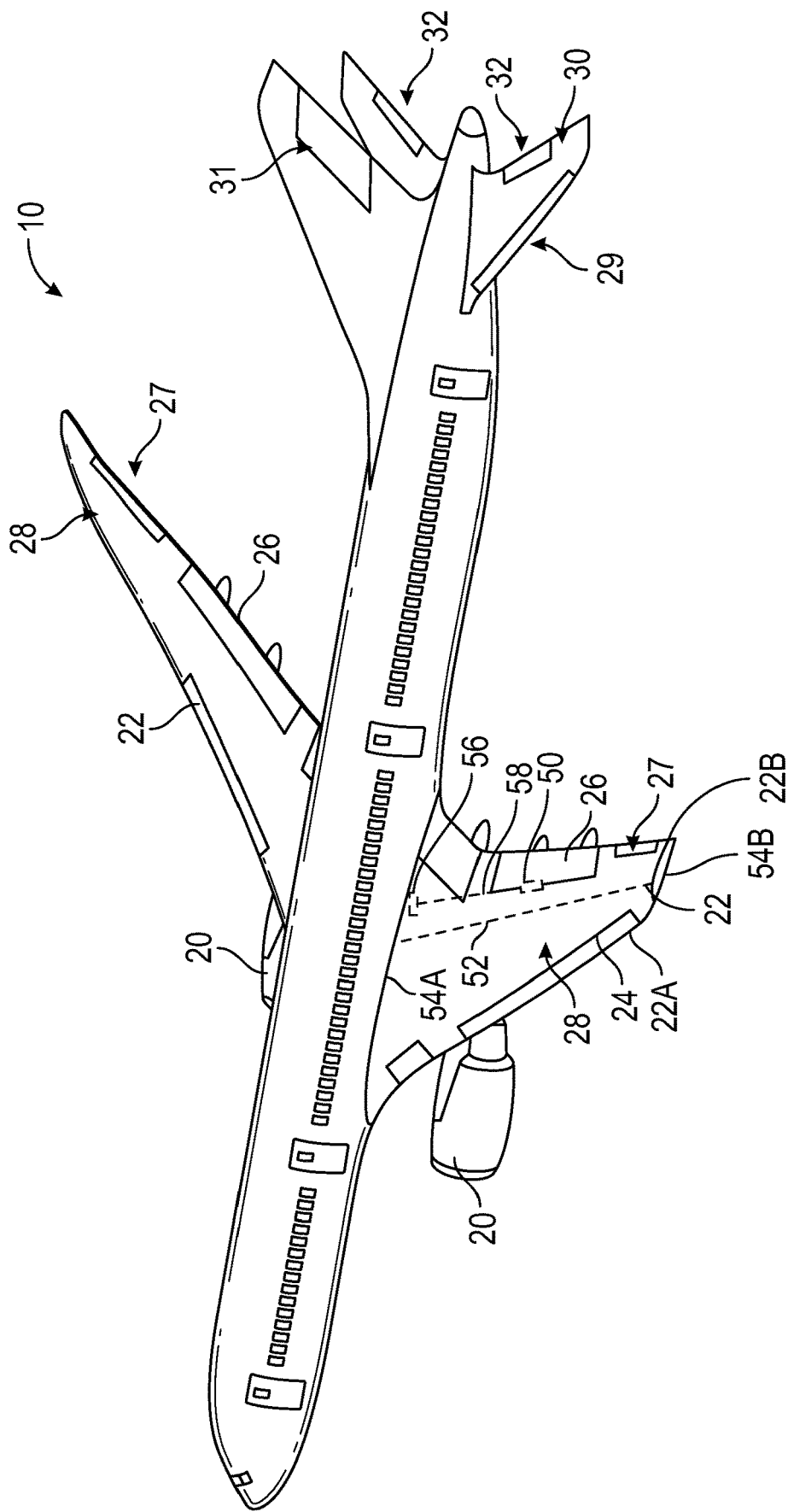
FIG. 1 is a perspective view of an aircraft that includes aerodynamic surfaces where embodiments of the present invention can be implemented.

FIG. 1 illustrates an example of a commercial aircraft 10 having aircraft engines surrounded by (or otherwise carried in) nacelles 20. The aircraft 10 includes two wings 22 that each extend from a leading edge 22A to a trailing edge 22B and can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable structures under aircraft power systems as compared with airframe stationary structures.

A hinge-line actuator 50 may be connected to a wing spar 52, e.g., that extends spanwise across the wing 22. The spar 52 can extend, for example, between inner and outer ends 54A, 54B of the wing 22. The actuator 50 may also be connected to the control surface of the aircraft, such as a flap 26 or aileron 27, for rotatably coupling the control surface to the wing 22.

Figure 2:
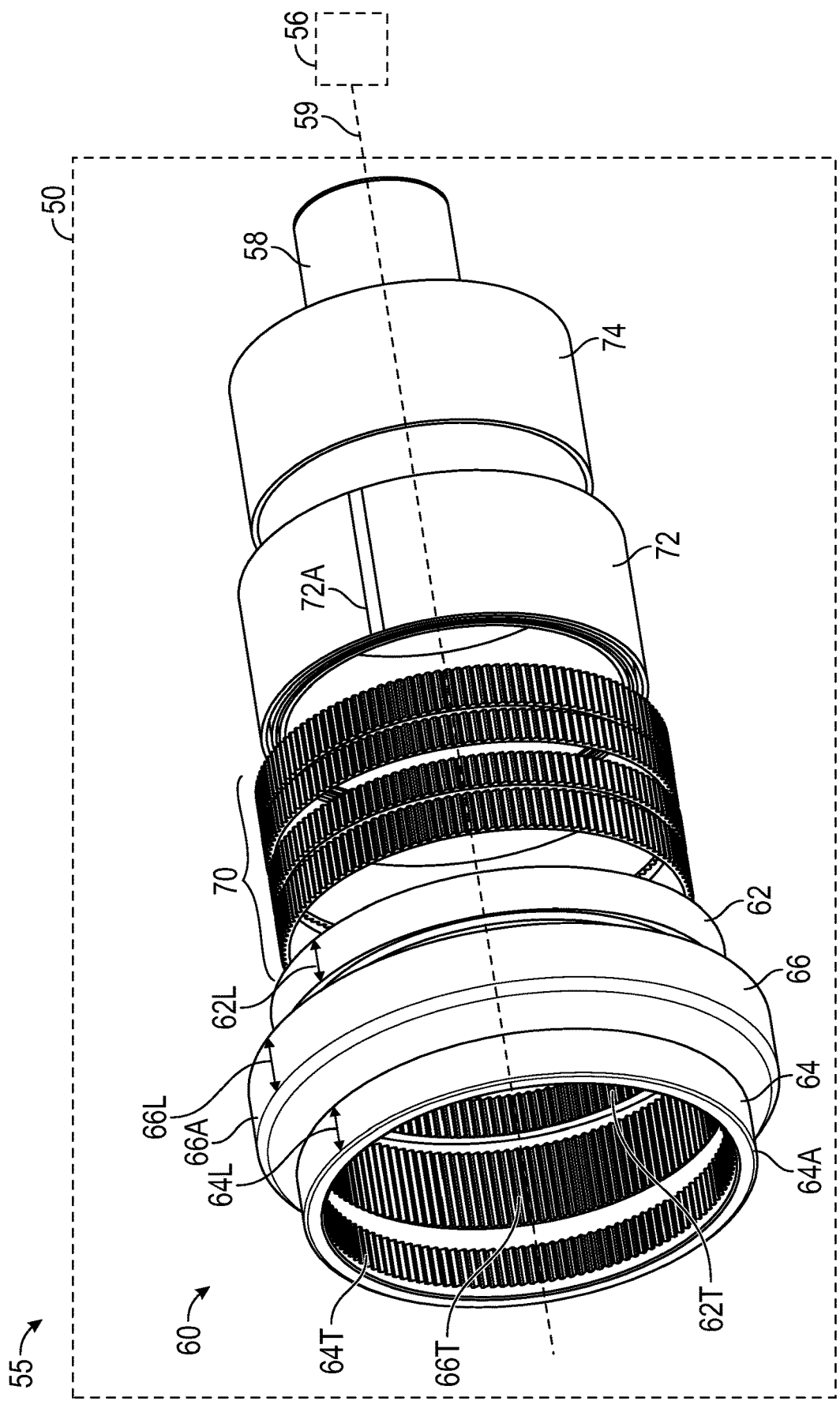
FIG. 2 is an exploded view of a harmonic gearset that may be useful for moving the aerodynamic surfaces.

FIG. 2 shows an actuator assembly 55 including the actuator 50 and motor 56. The figure shows aspects of the actuator 50 according to an embodiment. The actuator 50 includes a drive shaft (or motor shaft) 58 and the actuator 50 may be driven by the motor 56 via the drive shaft 58. More specifically, the actuator 50 includes a gearset 60 that is driven to rotate by the drive shaft 58. The gearset 60 includes first and second ground gears (or first and second gears) 62, 64 that are spaced apart along the drive shaft 58. An output gear (otherwise referred to as a third gear or center gear) 66 is disposed on the drive shaft 58, between the first and second ground gears 62, 64. The gears 62, 64, 66 may be ring gears.

The first ground gear 62 includes a first outer gear surface 62A that is cylindrical, first inner facing teeth 62T, and has a first gear axial length 62L. The second ground gear 64 includes a second outer gear surface 64A that is cylindrical, second inner facing teeth 64T and has a second gear axial length 64L. The first and second ground gears 62, 64 may be the same as each other. Thus, the axial lengths 62L, 64L of the first and second gear 62, 64 may be the same as each other. Further, the gear teeth configuration of the first and second ground gears 62, 64 may be the same as each other.

The output gear 66 includes a third outer gear surface 66A that is cylindrical. The output gear 66 also third gear inner facing teeth 66T and has a third gear axial length 66L.

The third gear axial length 66L is shown as being longer than the axial lengths 62L, 64L of the first and second gears 62, 64 though other configurations are within the scope of the embodiments. The gear teeth configuration of the output gear 66 may differ from that of the first and second gears 62, 64.

The gearset 60, as shown, is a compound harmonic reduction gearset that includes a flexspline set 70, discussed in greater detail below, that is radially surrounded by the first, second and third gears 62, 64, 66. A wave generator bearing set 72, including bearing 72A, are radially surrounded by the flexspline set 70, and a wave generator 74 is radially surrounded by the wave generator bearing set 72. The bearing 72A can be a rolling bearing in one embodiment. The drive shaft 58 is at least partially radially surrounded by the waver generator 74 and drives the wave generator 74. It is to be appreciated that the gearset may be a simple balanced harmonic gearset.

Figure 3:
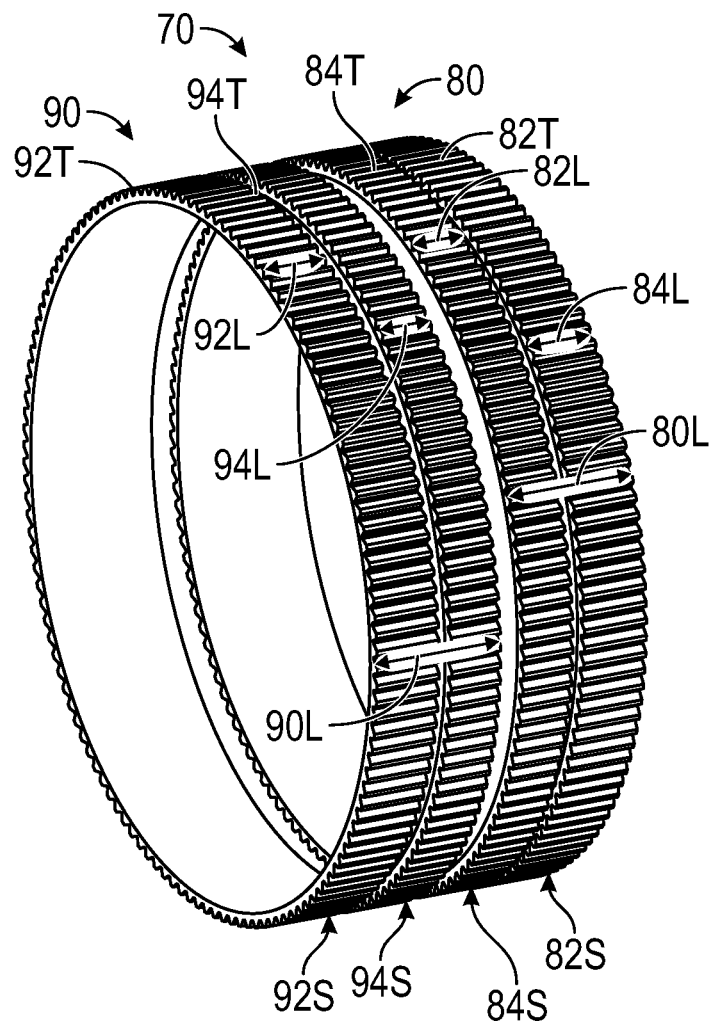
FIG. 3 shows a flexspline set for the gearset according to an embodiment.

Turning to FIG. 3, the flexspline set 70 includes a pair of flexsplines, including a first flexspline 80 and a second flexspline 90 to define a split flexspline. As will be discussed below, utilizing the flexspline set 70, instead of a single flexspline, may reduce interference between the teeth of the first, second and third gears 62, 64, 66 and the spline teeth during assembly, without limiting design options for the gear teeth and the spline teeth.

The first flexspline 80 may have a first flexspline axial length 80L. The first flexspline 80 may have a plurality of outer facing splines (or spline regions) that are axially adjacent to each other. The plurality of outer facing splines may include a first set of splines 82S (or axially outer set of splines relative to first and second flexspline meet-edges) defined by first outer facing teeth 82T that extend along an axial length 82L of the first set of splines 82S. The first outer facing teeth 82T may be configured to mesh with the first inner facing teeth 62T (FIG. 2) according to a first gear ratio (RATIO 1, below). The axial length 82L of the first set of splines 82S may be the same as the axial length 62L of the first gear 62 (FIG. 2).

The first flexspline 80 may have a second set of splines 84S (or axially inner set of splines relative to first and second flexspline meet-edges) defined by second outer facing teeth 84T that extend along an axial length 84L of the second set of splines 84S. The second outer facing teeth 84T may be configured to mesh with the third inner facing teeth 66T (FIG. 2) according to a second gear ratio (RATIO 2, below) that differs from the first gear ratio. The axial length 84L of the second set of splines 84S may be less than the axial length 66L of the third gear 66 (FIG. 2). The axial length 80L of the first flexspline 80 may be the same as the combination of the axial lengths 82L, 84L of the first and second sets of splines 82S, 84S.

The second flexspline 90 may have an axially reverse configuration as compared with the first set of splines 80. That is, the second flexspline 90 may have a second flexspline axial length 90L. The axial lengths 80L, 90L of the first and second flexsplines 80, 90 may be the same as each other.

The second flexspline 90 may have a plurality of outer facing splines (or spline regions) that are axially adjacent to each other. The plurality of outer facing splines may include a third set of splines 92S (or axially outer set of splines relative to first and second flexspline meet-edges) defined by third outer facing teeth 92T that extend along an axial length 92L of the third set of splines 92S. The third outer facing teeth 92T may be configured to mesh with the second inner facing teeth 64T (FIG. 2) according to a third gear ratio that may be the same as the first gear ratio. The axial length 92L of the third set of splines 92S may be the same as the axial length 64L of the second gear 64 (FIG. 2). That is, the first and third sets of splines 82S, 92S may be the same as each other.

The second flexspline 90 may have a fourth set of splines 94S (or axially inner set of splines relative to first and second flexspline meet-edges) defined by fourth outer facing teeth 94T that extend along an axial length 94L of the fourth set of splines 94S. The fourth outer facing teeth 94T may be configured to mesh with the third inner facing teeth 66T (FIG. 2) according to a third gear ratio that may be the same as the second gear ratio. The axial length 94L of the fourth set of splines 94S may be less than the axial length 66L of the third gear 66 (FIG. 2). That is, the second and fourth sets of splines 84S, 94S may be the same as each other. The axial length 90L of the second flexspline 90S may be the same as the combination of the axial lengths 92L, 94L of the third and fourth sets of splines 92S, 94S. The combination of the axial lengths 84L, 94L of the second and fourth sets of splines 84S, 94S may be the same as the axial length 66L of the third gear 66 (FIG. 2).

In the gearset 60, the first and third sets of spline 82S, 942S are axially spaced apart from each other and the second and fourth sets of splines 84S, 94S are axially adjacent to, and abut, each other. The second and fourth sets of splines 84S, 94S engage the output gear 66 and are thereby constrained to move with each other. Thus the different gear ratios together form a gear ratio, which in the illustrated embodiment is compound gear ratio (Gear Ratio, below). The gear ratio provides a differential motion between the ground gears 62, 64 and the output gear 66.

The gear ratio is represented as the difference of the individual gear ratios, shown below. The ratios are identified relative to the output gear 66 and one of the ground gears 62, 64 being that the ground gears are configured the same as each other. In the following, the output spline is the second or fourth set of splines 84S, 94S identified above, which are the same as each other. The ground spline is the first or third set of splines 82S, 92S identified above, which are the same as each other.

$$\text{Ratio 1} = \frac{\text{Teeth in Ground Spline }(82T)}{\text{Teeth in Ground Spline }(82T) - \text{Teeth in Ground Gear }(62T)}$$

$$\text{Ratio 2} = \frac{\text{Teeth in Output Spline }(84T)}{\text{Teeth in Output Spline }(84T) - \text{Teeth in Output Gear }(66T)}$$

$$\text{Gear Ratio} = \frac{1}{\frac{1}{\text{Ratio 1}} - \frac{1}{\text{Ratio2}}}$$

Figure 4:
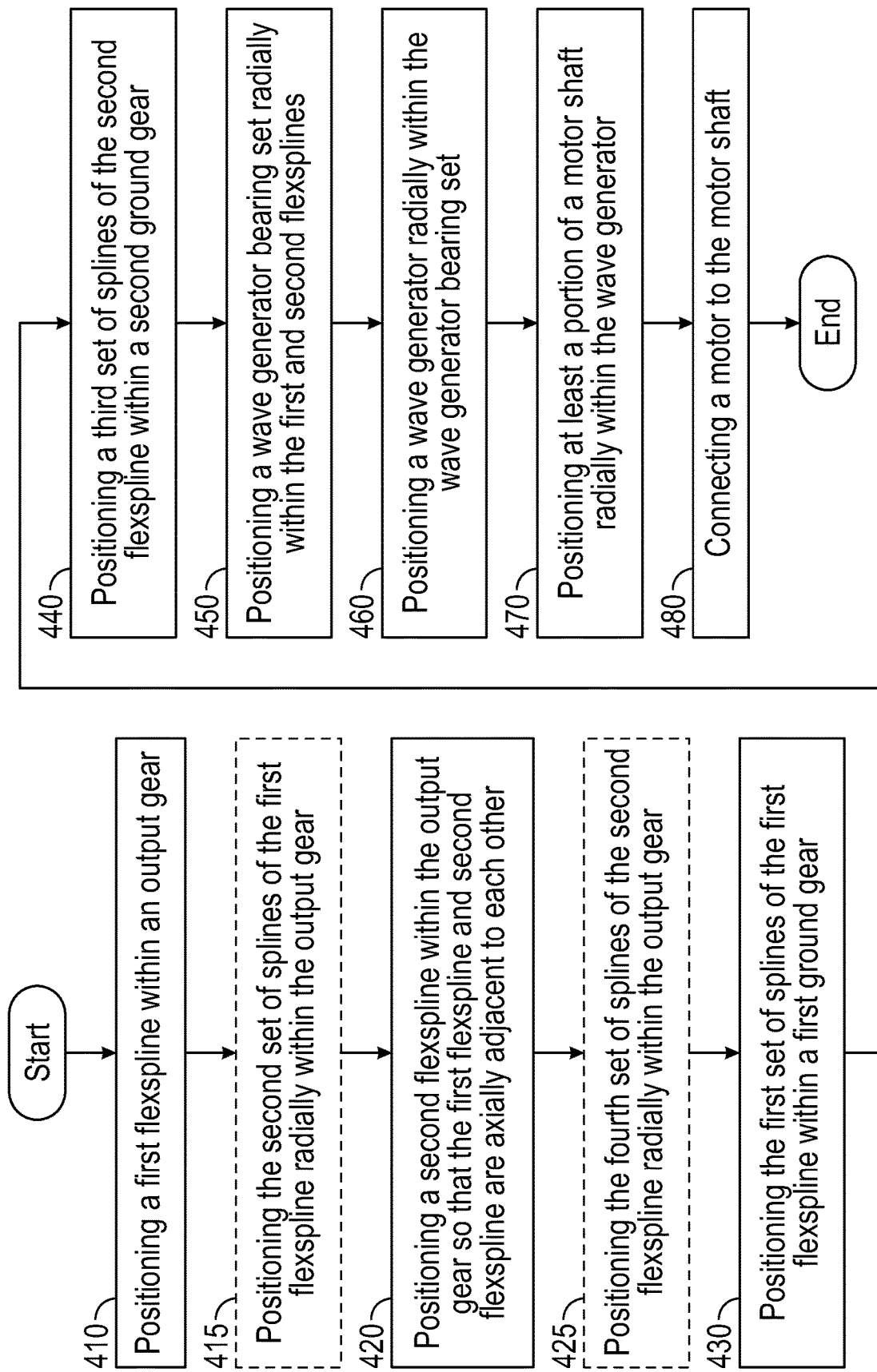
FIG. 4 is a flowchart showing a method of assembling the gearset.

Turning to FIG. 4, a flowchart shows a method of assembling a compound harmonic gearset 60. As shown in block 410, the method includes positioning the first flexspline 80 radially within the output gear 66. As indicated above, the first flexspline 80 has first and second sets of splines 82S, 84S that are axially adjacent to each other. As shown in block 415, positioning the first flexspline 80 radially within the output gear 66 (block 410) includes positioning the second set of splines 84S (e.g., the axial inner set of splines relative to first and second flexspline meet-edges) of the first flexspline 80 radially within the output gear 66. As shown in block 420, the method includes positioning the second flexspline 90 radially within the output gear 66 so that the first flexspline 80 and second flexspline 90 are axially adjacent to each other. As indicated above, the second flexspline 90 has third and fourth sets of splines 92S, 94S that are axially adjacent to each other. As shown in block 425, positioning the second flexspline 90 radially within the output gear 66 (block 420) includes positioning the fourth set of splines 94S (e.g., the axial inner set of splines relative to first and second flexspline meet-edges) of the second flexspline 90 radially within the output gear 66. As shown in block 430 the method includes positioning the first set of splines 82S (e.g., the axial outer set of splines relative to first and second flexspline meet-edges) of the first flexspline 80 radially within the first ground gear 62. As shown in block 440, the method includes positioning the third set of splines 92S (e.g., the axial outer set of splines relative to first and second flexspline meet-edges) of the second flexspline 90 radially within the second ground gear 64.

As shown in block 450, the method includes positioning the wave generator bearing set 72 radially within the first and second flexsplines 80, 90. As shown in block 460, the method includes positioning the wave generator 74 radially within the wave generator bearing set 72. As shown in block 470, the method includes positioning the drive shaft 58 radially within the wave generator 74. As shown in block 480, the actuator assembly 55 can be assembled by connecting the motor 56 to the drive shaft 58.

The above embodiments provide a pair of flexsplines 80, 90, each having a pair of set of splines or spline regions. The pair of flexsplines 80, 90 operate in parallel with each other and replace a configuration with a single flexspline having three splines.

Benefits of the disclosed embodiments include that the flexsplines 80, 90 are relatively simple to manufacture. For example, during manufacturing a unitary flexspline configuration, in which the second and fourth sets of splines 84S, 94S form a unitary axial center set of spline, removal from a manufacturing die or mold, e.g., from a metal injection mold process, might represent a challenge. This is because the axial outer set of splines 82S, 92S are the same as each other, but different than the axial center spline (e.g., sets of splines 84S, 94S), so that the differently configured spline teeth might jam against the mold groove profile. However, by providing two separate flexsplines 80, 90 with two sets of splines each 82S, 84S and 92S, 94S, if the die or mold is also split at the spline regions, the flexspline 80, 90 may be slid axially out of the die or a mold without interference. As the flexsplines 80, 90 have two sets of splines each instead of three, the manufacturing machinery can be simpler. Further, as the flexsplines 80, 90 can be the reverse configuration as each other, the same flexspline mold can be used for both flexsplines 80, 90, reducing manufacturing costs.

The gearset 60 is relatively simple to assemble as compared with a configuration having a single flexspline. With a single flexspline, the tooth profile of the axial center set of splines might interfere with the profile of the axial outer set of splines, making assembly difficult. Due to this issue with a configuration with a single set of splines, the axial center gear configuration of the output gear typically is required to have a greater diameter than the axial outer set of splines. With this configuration, the outer set of splines can be passed through the output gear 66 to enable alignment of the flexspline with the output gear 66. In addition, with a single flexspline configuration, assembly of the gearset 60 has to be performed with the wave generator 74 removed. In comparison, with two flexsplines 80, 90 the axial outer set of splines 82S, 92S do not need to slide through the output gear 66 and the wave generator 74 may be assembled into the flexsplines 80, 90 before earlier in the assembly process.

The split flexspline also provide for a greater design flexibility. As indicated, with a single flexspline, the axial center region is typically required to be larger than the axial outer regions for assembly purposes. With a two flexsplines 80, 90, the axial outer sets of splines 82S, 92S may be the same size or perhaps larger than the axial inner sets of splines 84S, 94S that engage the output gear 66. This provides more options for tooth profile development.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed as:

1. A harmonic gearset, comprising:
a drive shaft;
first and second ground gears spaced apart from each other along the drive shaft;
an output gear disposed on the drive shaft, between the first and second ground gears;
a first flexspline disposed radially between the drive shaft, the first ground gear and the output gear; and
a second flexspline disposed radially between the drive shaft, the second ground gear and the output gear, wherein the first and second flexsplines are axially adjacent to each other,
wherein:
the first flexspline has a first set of splines that engages the first ground gear and a second set of splines that engages the output gear; and
the second flexspline has a third set of splines that engages the second ground gear and a fourth set of splines that engages the output gear.

2. The gearset of claim 1, wherein the first and third sets of splines have a same shape as each other.

3. The gearset of claim 1, wherein the second and fourth sets of splines have a same shape as each other.

4. The gearset of claim 1, wherein the first and second flexsplines have a same shape as each other.

5. The gearset of claim 1, further comprising:
a wave generator that is driven by the drive shaft; and
a wave generator bearing set disposed radially between the wave generator and the first and second flexsplines.

6. An actuator assembly, comprising:
a motor; and
the gearset of claim 1, wherein the drive shaft is driven by the motor.

7. An aircraft comprising:
a movable structure;
a stationary structure;
the actuator assembly of claim 6, operationally coupled between the movable structure and the stationary structure.

8. The aircraft of claim 7, wherein:
the movable structure is a control surface; and
the stationary structure is an airframe.

9. A method of assembling a harmonic gearset, comprising:
positioning a first flexspline radially within an output gear;
positioning a second flexspline radially within the output gear so that the first flexspline and the second flexspline are axially adjacent to each other,
wherein:
the first flexspline includes a first set of splines and a second set of splines that are axially adjacent to each other, and the second flexspline includes a third set of splines and a fourth set of splines that are axially adjacent to each other, and wherein:
positioning the first flexspline radially within the output gear includes positioning the second set of splines of the first flexspline radially within the output gear; and
positioning the second flexspline radially within the output gear includes positioning the fourth set of splines of the second flexspline radially within the output gear.

10. The method of claim 9, further comprises:
positioning the first set of splines of the first flexspline radially within a first ground gear; and
positioning the third set of splines of the second flexspline radially within a second ground gear.

11. The method of claim 10, comprising:
positioning a wave generator bearing set radially within the first and second flexsplines;
positioning a wave generator radially within the wave generator bearing set; and
positioning a drive shaft radially within the wave generator.

12. A method of assembling an actuator assembly, comprising:
assembling the harmonic gearset according to the method of claim 11, and
connecting a motor to the drive shaft.

* * * * *